United States Patent
Ancrum et al.

(10) Patent No.: US 12,511,995 B2
(45) Date of Patent: Dec. 30, 2025

(54) IDENTIFYING ROADWAY SAFETY EVENTS IN REMOTE VEHICLES

(71) Applicant: GM Global Technology Operations LLC, Detroit, MI (US)

(72) Inventors: Derek Beaulieu Ancrum, Whitby (CA); Donald K. Grimm, Utica, MI (US); Shawn F. Granda, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 96 days.

(21) Appl. No.: 18/439,029

(22) Filed: Feb. 12, 2024

(65) Prior Publication Data

US 2025/0259540 A1  Aug. 14, 2025

(51) Int. Cl.
| | | |
|---|---|---|
| *G08G 1/0967* | (2006.01) | |
| *G08G 1/01* | (2006.01) | |
| *G08G 1/052* | (2006.01) | |
| *G08G 1/0968* | (2006.01) | |

(52) U.S. Cl.
CPC ......... *G08G 1/0967* (2013.01); *G08G 1/0112* (2013.01); *G08G 1/0116* (2013.01); *G08G 1/0133* (2013.01); *G08G 1/052* (2013.01); *G08G 1/0968* (2013.01)

(58) Field of Classification Search
CPC .. G08G 1/0967; G08G 1/0112; G08G 1/0116; G08G 1/0133; G08G 1/052; G08G 1/0968
See application file for complete search history.

(56) References Cited

U.S. PATENT DOCUMENTS

| | | | |
|---|---|---|---|
| 8,005,615 B2 * | 8/2011 | Okabe | B60T 8/17558 701/301 |
| 2004/0206570 A1 * | 10/2004 | Tajima | B62D 6/002 701/41 |
| 2008/0033621 A1 * | 2/2008 | Nakamura | B60W 10/184 701/65 |
| 2008/0109140 A1 * | 5/2008 | Hozumi | B60N 2/0277 701/49 |
| 2008/0109166 A1 * | 5/2008 | Takaoka | G01C 21/28 701/472 |
| 2009/0009305 A1 * | 1/2009 | Kataoka | G08G 1/167 340/439 |
| 2009/0084173 A1 * | 4/2009 | Gudat | G01S 13/88 73/146 |
| 2009/0271113 A1 * | 10/2009 | Chang | G01C 21/165 701/472 |

(Continued)

FOREIGN PATENT DOCUMENTS

| | | |
|---|---|---|
| DE | 102014008980 A1 | 11/2014 |
| DE | 102015213227 A1 | 1/2017 |

(Continued)

*Primary Examiner* — Hussein Elchanti
(74) *Attorney, Agent, or Firm* — Vivacqua Crane, PLLC

(57) ABSTRACT

According to several aspects, a method for identifying roadway safety events may include performing a measurement of one or more target vehicles using a sensor. The method further may include identifying a safety event based at least in part on the measurement of the of one or more target vehicles. The method further may include performing an action based at least in part on the safety event.

14 Claims, 4 Drawing Sheets

(56) References Cited

U.S. PATENT DOCUMENTS

| | | | |
|---|---|---|---|
| 2010/0030435 A1* | 2/2010 | Hattori | B60N 2/986 |
| | | | 701/45 |
| 2010/0100268 A1* | 4/2010 | Zhang | G06V 20/582 |
| | | | 701/25 |
| 2013/0027511 A1* | 1/2013 | Takemura | G06V 20/588 |
| | | | 348/42 |
| 2015/0254986 A1* | 9/2015 | Fairfield | G05D 1/81 |
| | | | 707/687 |
| 2016/0197484 A1* | 7/2016 | Jost | G01D 21/00 |
| | | | 307/116 |
| 2016/0334230 A1* | 11/2016 | Ross | G05D 1/0027 |
| 2017/0018179 A1* | 1/2017 | Gutierrez | G08G 1/096791 |
| 2017/0141873 A1* | 5/2017 | Mandeville-Clarke | |
| | | | H04W 4/80 |
| 2017/0255199 A1* | 9/2017 | Boehmke | G01S 7/4972 |
| 2017/0262709 A1* | 9/2017 | Wellington | G06V 10/764 |
| 2018/0032076 A1* | 2/2018 | Lombrozo | B60W 60/0017 |
| 2018/0040246 A1* | 2/2018 | Yonemura | H04W 4/027 |
| 2018/0053141 A1* | 2/2018 | Shydo, Jr. | G05D 1/104 |
| 2018/0059779 A1* | 3/2018 | Sisbot | G06T 19/20 |
| 2018/0075538 A1* | 3/2018 | Konrardy | G08G 1/005 |
| 2018/0082494 A1* | 3/2018 | Rech | G05D 1/0088 |
| 2018/0204398 A1* | 7/2018 | Smith | G07C 5/0808 |
| 2018/0349784 A1* | 12/2018 | Zheng | G05D 1/2462 |
| 2019/0163176 A1* | 5/2019 | Wang | G05D 1/0088 |
| 2021/0020048 A1* | 1/2021 | Perko | G08G 1/096758 |

FOREIGN PATENT DOCUMENTS

| | | |
|---|---|---|
| DE | 102016203746 A1 | 9/2017 |
| DE | 102018215008 A1 | 3/2020 |
| DE | 102020212032 A1 | 3/2022 |
| DE | 112020005063 T5 | 8/2022 |
| DE | 102022116391 A1 | 1/2024 |

* cited by examiner

IDENTIFYING ROADWAY SAFETY EVENTS IN REMOTE VEHICLES

INTRODUCTION

The present disclosure relates to systems and methods for identifying roadway safety events for a vehicle.

To increase occupant awareness and convenience, vehicles may be equipped with sensing and communication systems allowing for communication between vehicles on a roadway. Communication systems may be used to transmit information between vehicles, such as, for example, location, heading, velocity, and/or the like. Such information may be used to identify roadway safety events, such as, for example, heavy braking or near collisions. Vehicles may also be equipped with advanced driver assistance systems (ADAS) which enable the vehicle to notify the occupant and/or take action based on information related to roadway safety events. However, some vehicles may not be equipped with communication systems and thus may not have the capability to transmit information to other vehicles. Without information about remote vehicle location, heading, velocity and/or the like, performance and/or feature availability of the ADAS system may be reduced.

Thus, while sensing and communication systems and methods achieve their intended purpose, there is a need for a new and improved system and method for identifying roadway safety events for a vehicle.

SUMMARY

According to several aspects, a method for identifying roadway safety events is provided. The method may include performing a measurement of one or more target vehicles using a sensor. The method further may include identifying a safety event based at least in part on the measurement of the of one or more target vehicles. The method further may include performing an action based at least in part on the safety event.

In another aspect of the present disclosure, performing the measurement further may include performing the measurement of the one or more target vehicles. The sensor includes at least one of: a host vehicle sensor of a host vehicle, a mobile device, and a roadside unit (RSU). The measurement of the one or more target vehicles includes at least a target vehicle location of each of the one or more target vehicles and a target vehicle velocity of each of the one or more target vehicles.

In another aspect of the present disclosure, performing the measurement further may include performing the measurement of the one or more target vehicles. The sensor is the host vehicle sensor of the host vehicle.

In another aspect of the present disclosure, performing the measurement further may include extrapolating at least one of: the target vehicle location and the target vehicle velocity of a first target vehicle of the one or more target vehicles in response to determining that the first target vehicle is outside of a field of view of the sensor. The at least one of: the target vehicle location and the target vehicle velocity of the first target vehicle is extrapolated based at least in part on one or more past measurements of the first target vehicle.

In another aspect of the present disclosure, identifying the safety event further may include evaluating the measurement of the one or more target vehicles to identify a target-to-infrastructure safety event. Identifying the safety event further may include evaluating the measurement of the one or more target vehicles to identify a target-to-target safety event. Identifying the safety event further may include evaluating the measurement of the one or more target vehicles to identify an erratic driving safety event. Identifying the safety event further may include evaluating the measurement of the one or more target vehicles to identify an unobserved safety event.

In another aspect of the present disclosure, evaluating the measurement of the one or more target vehicles to identify the target-to-infrastructure safety event further may include evaluating the measurement of the one or more target vehicles based at least in part on one or more traffic regulations. Evaluating the measurement of the one or more target vehicles to identify the target-to-infrastructure safety event further may include identifying the target-to-infrastructure safety event in response to determining that at least one of the one or more target vehicles is in violation of the one or more traffic regulations.

In another aspect of the present disclosure, evaluating the measurement of the one or more target vehicles to identify the target-to-infrastructure safety event further may include calculating a time-to-collision between a first target vehicle and a second target vehicle of the one or more target vehicles based at least in part on the measurement of the one or more target vehicles. Evaluating the measurement of the one or more target vehicles to identify the target-to-infrastructure safety event further may include identifying the target-to-target safety event in response to determining that the time-to-collision is less than or equal to a predetermined time-to-collision threshold.

In another aspect of the present disclosure, evaluating the measurement of the one or more target vehicles to identify the erratic driving safety event further may include executing an erratic driving identification machine learning model. The erratic driving identification machine learning model is configured to receive the measurement of the one or more target vehicles as an input and identify the erratic driving safety event based at least in part on the measurement of the one or more target vehicles.

In another aspect of the present disclosure, evaluating the measurement of the one or more target vehicles to identify the unobserved safety event further may include executing an unobserved safety event identification machine learning model. The unobserved safety event identification machine learning model is configured to receive the measurement of the one or more target vehicles as an input and identify the unobserved safety event based at least in part on the measurement of the one or more target vehicles. The unobserved safety event occurs outside of a field of view of the sensor.

In another aspect of the present disclosure, performing the action based at least in part on the safety event further may include providing an in-vehicle warning to an occupant. Performing the action based at least in part on the safety event further may include providing a navigation suggestion based at least in part on a quantity of safety events within a particular geographical area.

According to several aspects, a system for identifying roadway safety events for a host vehicle is provided. The system may include a remote server system including a server communication system. The system further may include a server controller in electrical communication with the server communication system. The server controller is programmed to receive a measurement of one or more target vehicles using the server communication system. The server controller is further programmed to identify a safety event based at least in part on the measurement of the one or more target vehicles. The server controller is further programmed to perform an action based at least in part on the safety event.

In another aspect of the present disclosure, to identify the safety event, the server controller is further programmed to evaluate the measurement of the one or more target vehicles to identify a target-to-infrastructure safety event. To identify the safety event, the server controller is further programmed to evaluate the measurement of the one or more target vehicles to identify a target-to-target safety event. To identify the safety event, the server controller is further programmed to evaluate the measurement of the one or more target vehicles to identify an erratic driving safety event. To identify the safety event, the server controller is further programmed to evaluate the measurement of the one or more target vehicles to identify an unobserved safety event.

In another aspect of the present disclosure, to identify the safety event, the server controller is further programmed to evaluate the measurement of the one or more target vehicles based at least in part on one or more traffic regulations. To identify the safety event, the server controller is further programmed to calculate a time-to-collision between a first target vehicle and a second target vehicle of the one or more target vehicles based at least in part on the measurement of the one or more target vehicles. To identify the safety event, the server controller is further programmed to identify the target-to-infrastructure safety event in response to determining that at least one of the one or more target vehicles is in violation of the one or more traffic regulations. To identify the safety event, the server controller is further programmed to identify the target-to-target safety event in response to determining that the time-to-collision is less than or equal to a predetermined time-to-collision threshold.

In another aspect of the present disclosure, to evaluate the measurement of the one or more target vehicles to identify the erratic driving safety event, the server controller is further programmed to execute an erratic driving identification machine learning model. The erratic driving identification machine learning model is configured to receive the measurement of the one or more target vehicles as an input and identify the erratic driving safety event based at least in part on the measurement of the one or more target vehicles.

In another aspect of the present disclosure, to evaluate the measurement of the one or more target vehicles to identify the unobserved safety event, the server controller is further programmed to execute an unobserved safety event identification machine learning model. The unobserved safety event identification machine learning model is configured to receive the measurement of the one or more target vehicles as an input and identify the unobserved safety event based at least in part on the measurement of the one or more target vehicles.

In another aspect of the present disclosure, the system further includes a host vehicle system including a host vehicle communication system. The host vehicle system further includes a host vehicle sensor. The host vehicle system further includes a host vehicle controller in electrical communication with the host vehicle communication system and the host vehicle sensor. The host vehicle controller is programmed to perform a measurement of one or more target vehicles using the host vehicle sensor. The one or more target vehicles are remote from the host vehicle. The host vehicle controller is further programmed to transmit the measurement of the one or more target vehicles to the remote server system using the host vehicle communication system.

In another aspect of the present disclosure, to perform the action based at least in part on the safety event, the server controller is further programmed to transmit a safety event message to the host vehicle using the server communication system. The safety event message includes information regarding the safety event. The host vehicle system further may include a host vehicle display in electrical communication with the host vehicle controller. To perform the action based at least in part on the safety event, the host vehicle controller is further programmed to receive the safety event message from the remote server system using the host vehicle communication system. To perform the action based at least in part on the safety event, the host vehicle controller is further programmed to provide an in-vehicle warning to an occupant of the host vehicle using the host vehicle display based at least in part on the safety event message.

According to several aspects, a method for identifying roadway safety events is provided. The method may include performing a measurement of one or more target vehicles using a sensor. The sensor is remote from the one or more target vehicles. The sensor includes at least one of: a host vehicle sensor of a host vehicle, a mobile device, and a roadside unit (RSU). The measurement of the one or more target vehicles includes at least a target vehicle location of each of the one or more target vehicles and a target vehicle velocity of each of the one or more target vehicles. The method further may include identifying a safety event based at least in part on the measurement of the of one or more target vehicles. The safety event includes at least one of: a target-to-infrastructure safety event, a target-to-target safety event, an erratic driving safety event, and an unobserved safety event. The method further may include performing an action based at least in part on the safety event.

In another aspect of the present disclosure, performing the measurement further may include extrapolating at least one of: the target vehicle location and the target vehicle velocity of a first target vehicle of the one or more target vehicles in response to determining that the first target vehicle is outside of a field of view of the sensor. The at least one of: the target vehicle location and the target vehicle velocity of the first target vehicle is extrapolated based at least in part on one or more past measurements of the first target vehicle.

In another aspect of the present disclosure, identifying the safety event further may include evaluating the measurement of the one or more target vehicles based at least in part on one or more traffic regulations. Identifying the safety event further may include identifying the target-to-infrastructure safety event in response to determining that the first target vehicle is in violation of the one or more traffic regulations. Identifying the safety event further may include calculating a time-to-collision between the first target vehicle and a second target vehicle based at least in part on the measurement of the one or more target vehicles. Identifying the safety event further may include identifying the target-to-target safety event in response to determining that the time-to-collision is less than or equal to a predetermined time-to-collision threshold. Identifying the safety event further may include executing an erratic driving identification machine learning model. The erratic driving identification machine learning model is configured to receive the measurement of the one or more target vehicles as an input and identify the erratic driving safety event based at least in part on the measurement of the one or more target vehicles. Identifying the safety event further may include executing an unobserved safety event identification machine learning model. The unobserved safety event identification machine learning model is configured to receive the measurement of the one or more target vehicles as an input and identify the unobserved safety event based at least in part on the measurement of the one or more target vehicles. The unobserved safety event occurs outside of the field of view of the sensor.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In aspects of the present disclosure, it is advantageous to collect data about vehicles on the roadway (e.g., location, heading, velocity, and/or the like). In some aspects, it is possible to retrieve such data directly from vehicles using wireless communications systems. However, in aspects of the present disclosure, some vehicles may not be equipped with the sensing and/or communication capabilities necessary to facilitate data collection. Therefore, the present disclosure provides a new and improved system and method for identifying roadway safety events by enabling collection of data about remote vehicles.

Figure 1:
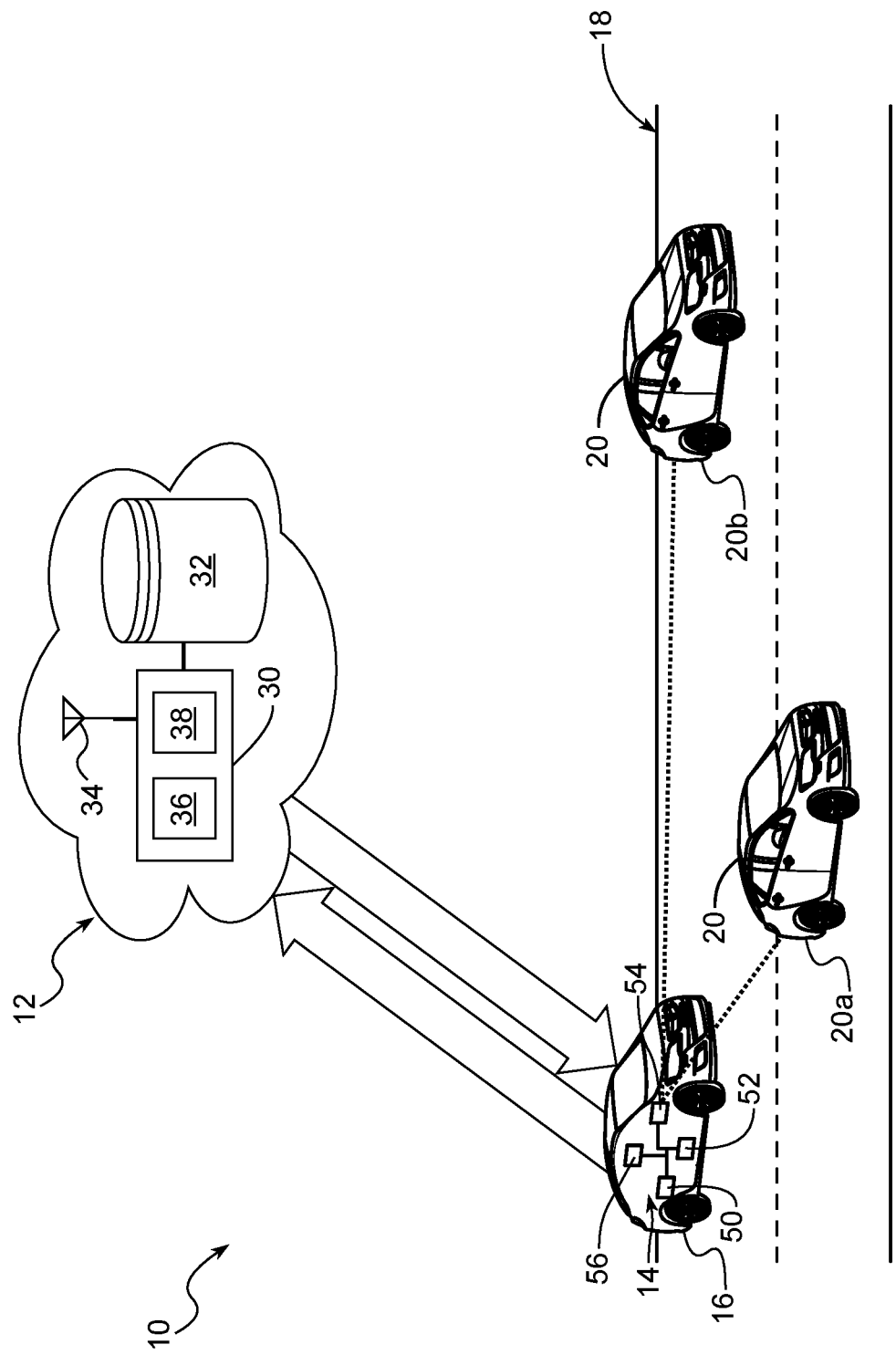
FIG. 1 is a schematic diagram of a system for identifying roadway safety events, according to an exemplary embodiment.

Referring to FIG. 1, a system for identifying roadway safety events is illustrated and generally indicated by reference number 10. The system 10 generally includes a remote server system 12 and a host vehicle system 14 in a host vehicle 16. The system 10 is shown in the exemplary context of a roadway 18 including one or more target vehicles 20. It should be understood that the roadway 18 may include any open way for passage and transportation of vehicles (e.g., roads, streets, highways, expressways, freeways, boulevards, avenues, parkways, alleys, bridges, tunnels, and/or the like). In the exemplary embodiment shown in FIG. 1, the one or more target vehicles 20 includes a first target vehicle 20a and a second target vehicle 20b. It should be understood that the one or more target vehicles 20 may include any number of vehicles occupying the roadway 18. The one or more target vehicles 20 may include, for example, sport utility vehicles (SUVs), sedans, compact cars, trucks, utility vehicles, and/or the like. In some examples, the one or more target vehicles may further include additional roadway users, such as, for example, pedestrians, bicycles, and/or the like.

The remote server system 12 includes a server controller 30 in electrical communication with a server database 32 and a server communication system 34. In a non-limiting example, the remote server system 12 is located in a server farm, datacenter, roadside unit (RSU), or the like, and is connected to the internet.

The server controller 30 is used to implement a method 100 for identifying roadway safety events, as will be described below. The server controller 30 includes at least one server processor 36 and a non-transitory computer readable storage device or server media 38. The server processor 36 may be a custom made or commercially available processor, a central processing unit (CPU), a graphics processing unit (GPU), an auxiliary processor among several processors associated with the server controller 30, a semiconductor-based microprocessor (in the form of a microchip or chip set), a macroprocessor, a combination thereof, or generally a device for executing instructions. The computer readable storage device or server media 38 may include volatile and nonvolatile storage in read-only memory (ROM), random-access memory (RAM), and keep-alive memory (KAM), for example. KAM is a persistent or non-volatile memory that may be used to store various operating variables while the server processor 36 is powered down. The computer-readable storage device or server media 38 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions used by the server controller 30 perform the method 100. The server controller 30 may also consist of multiple controllers which are in electrical communication with each other.

The server controller 30 is in electrical communication with the server database 32 and the server communication system 34. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the server controller 30 are within the scope of the present disclosure.

The server database 32 is used to store information about the one or more target vehicles 20, as will be discussed in greater detail below. The server database 32 may also store detailed maps of roadways, including, for example, information about lane boundaries, road geometry, speed limits, traffic signs, and/or other relevant features. In an exemplary embodiment, the server database 32 includes one or more mass storage devices, such as, for example, hard disk drives, magnetic tape drives, magneto-optical disk drives, optical disks, solid-state drives, and/or additional devices operable to store data in a persisting and machine-readable fashion. In some examples, the one or more mass storage devices may be configured to provide redundancy in case of hardware failure and/or data corruption, using, for example, a redundant array of independent disks (RAID). In a non-limiting example, the server controller 30 may execute software such as, for example, a database management system (DBMS), allowing data stored on the one or more mass storage devices to be organized and accessed. The server database 32 is in electrical communication with the server controller 30, as discussed above.

The server communication system 34 is used by the server controller 30 to communicate with other systems external to the remote server system 12. For example, the server communication system 34 includes capabilities for communication with vehicles, infrastructure, other remote systems at a remote call center (e.g., ON-STAR by GENERAL MOTORS) and/or personal devices. In certain embodiments, the server communication system 34 is a wireless communication system configured to communicate via a wireless local area network (WLAN) using IEEE 802.11 standards or by using cellular data communication (e.g., using GSMA standards, such as, for example, SGP.02, SGP.22, SGP.32, and the like). Accordingly, the server communication system 34 may further include an embedded universal integrated circuit card (eUICC) configured to store at least one cellular connectivity configuration profile, for example, an embedded subscriber identity module (eSIM) profile.

The server communication system 34 is further configured to communicate via a personal area network (e.g., BLUETOOTH), near-field communication (NFC), and/or any additional type of radiofrequency communication. However, additional or alternate communication methods, such as a dedicated short-range communications (DSRC) channel and/or mobile telecommunications protocols based on the 3rd Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 30, 15, 16 and/or future 3GPP releases are considered within the scope of the present disclosure.

Accordingly, the server communication system 34 may include one or more antennas and/or communication transceivers for receiving and/or transmitting signals. The server communication system 34 is configured to wirelessly communicate information between the remote server system 12 and at least the host vehicle 16. It should be understood that the server communication system 34 may be integrated with the server controller 30 (e.g., on a same circuit board with the server controller 30 or otherwise a part of the server controller 30) without departing from the scope of the present disclosure. The server communication system 34 is in electrical communication with the server controller 30, as discussed above.

Figure 2:
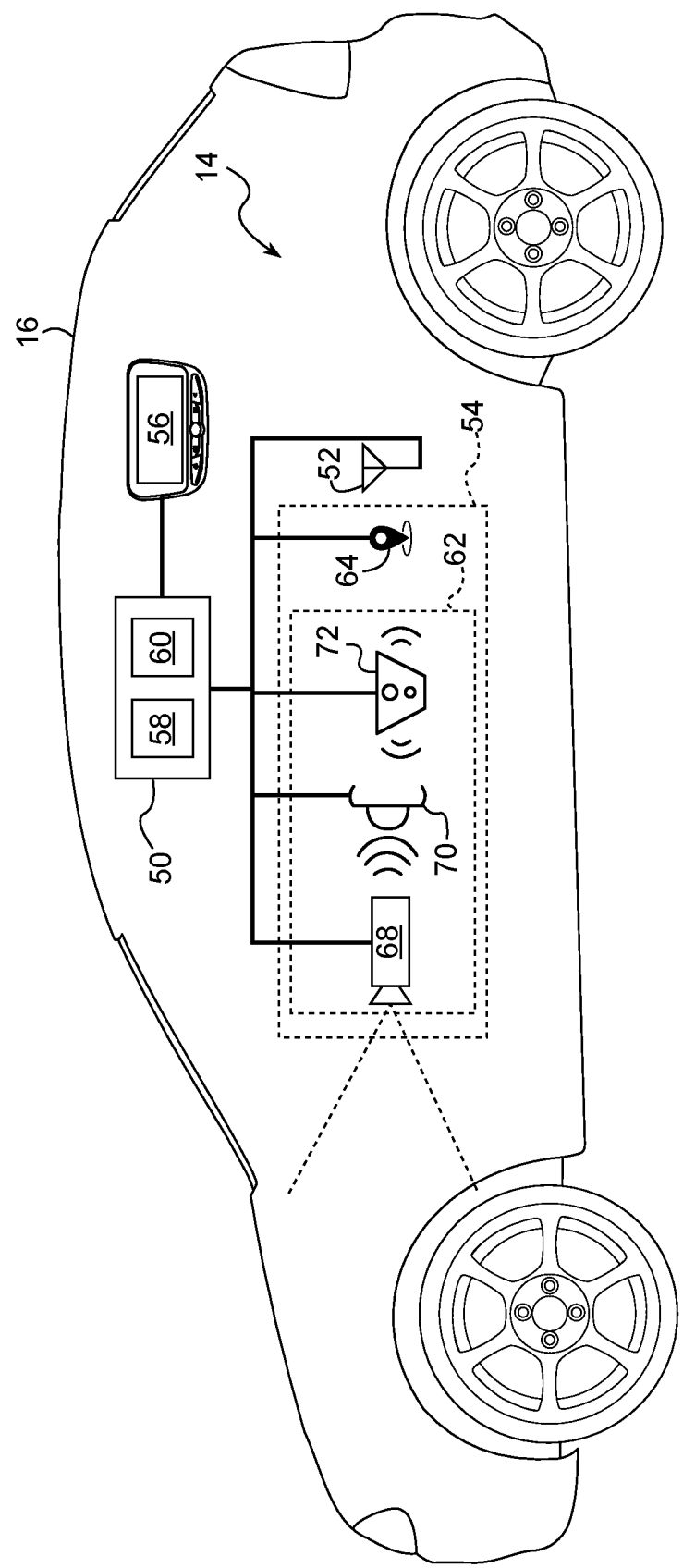
FIG. 2 is a schematic diagram of a host vehicle system, according to an exemplary embodiment.

Referring to FIG. 2, a schematic diagram of the host vehicle system 14 is shown. The host vehicle system 14 is shown with the exemplary host vehicle 16. While a passenger vehicle is illustrated, it should be appreciated that the host vehicle 16 may be any type of vehicle without departing from the scope of the present disclosure. The host vehicle system 14 generally includes a host vehicle controller 50, a host vehicle communication system 52, a host vehicle sensor 54, and a host vehicle display 56.

The host vehicle controller 50 is used in conjunction with the server controller 30 to implement the method 100 for identifying roadway safety events, as will be described below. The host vehicle controller 50 includes at least one host vehicle processor 58 and a non-transitory computer readable storage device or host vehicle media 60. The host vehicle processor 58 may be a custom made or commercially available processor, a central processing unit (CPU), a graphics processing unit (GPU), an auxiliary processor among several processors associated with the host vehicle controller 50, a semiconductor-based microprocessor (in the form of a microchip or chip set), a macroprocessor, a combination thereof, or generally a device for executing instructions. The computer readable storage device or host vehicle media 60 may include volatile and nonvolatile storage in read-only memory (ROM), random-access memory (RAM), and keep-alive memory (KAM), for example. KAM is a persistent or non-volatile memory that may be used to store various operating variables while the host vehicle processor 58 is powered down. The computer-readable storage device or host vehicle media 60 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the host vehicle controller 50 to control various systems of the host vehicle 16. The host vehicle controller 50 may also consist of multiple controllers which are in electrical communication with each other. The host vehicle controller 50 may be inter-connected with additional systems and/or controllers of the host vehicle 16, allowing the host vehicle controller 50 to access data such as, for example, speed, acceleration, braking, and steering angle of the host vehicle 16.

The host vehicle controller 50 is in electrical communication with the host vehicle communication system 52, the host vehicle sensor 54, and the host vehicle display 56. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the host vehicle controller 50 are within the scope of the present disclosure.

The host vehicle communication system 52 is used by the host vehicle controller 50 to communicate with other systems external to the host vehicle 16 (e.g., the remote server system 12). For example, the host vehicle communication system 52 includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the host vehicle 16 and any remote system (e.g., vehicles, infrastructure, and/or remote systems). In certain embodiments, the host vehicle communication system 52 is a wireless communication system configured to communicate via a wireless local area network (WLAN) using IEEE 802.11 standards or by using cellular data communication (e.g., using GSMA standards, such as, for example, SGP.02, SGP.22, SGP.32, and the like). Accordingly, the host vehicle communication system 52 may further include an embedded universal integrated circuit card (eUICC) configured to store at least one cellular connectivity configuration profile, for example, an embedded subscriber identity module (eSIM) profile.

The host vehicle communication system 52 is further configured to communicate via a personal area network (e.g., BLUETOOTH), near-field communication (NFC), and/or any additional type of radiofrequency communication. However, additional or alternate communication methods, such as a dedicated short-range communications (DSRC) channel and/or mobile telecommunications protocols based on the 3rd Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 50, 15, 16 and/or future 3GPP releases are considered within the scope of the present disclosure.

Accordingly, the host vehicle communication system 52 may include one or more antennas and/or communication transceivers for receiving and/or transmitting signals, such as cooperative sensing messages (CSMs). The host vehicle communication system 52 is configured to wirelessly communicate information between the host vehicle 16 and another vehicle. Further, the host vehicle communication system 52 is configured to wirelessly communicate information between the host vehicle 16 and infrastructure or other vehicles. Further, the host vehicle communication system 52 is configured to wirelessly communicate information between the host vehicle 16 and the remote server system 12. It should be understood that the host vehicle communication system 52 may be integrated with the host vehicle controller 50 (e.g., on a same circuit board with the host vehicle controller 50 or otherwise a part of the host vehicle controller 50) without departing from the scope of the present disclosure.

The host vehicle sensor 54 is used to acquire information about the one or more target vehicles 20. In an exemplary embodiment, the host vehicle sensor 54 includes at least a perception sensor 62 and a global navigation satellite system (GNSS) 64.

The perception sensor 62 is used to perceive objects and/or measure distances in the environment surrounding the host vehicle 16. In an exemplary embodiment, the perception sensor 62 includes at least one of: a camera 68, a radar sensor 70, and a light detection and ranging (LiDAR) sensor 72.

The camera 68 is a perception sensor used to capture images and/or videos of the environment surrounding the host vehicle 16. In an exemplary embodiment, the camera 68 includes a photo and/or video camera which is positioned to view the environment surrounding the host vehicle 16. In a non-limiting example, the camera 68 includes a camera affixed inside of the host vehicle 16, for example, in a headliner of the host vehicle 16, having a view through a windscreen of the host vehicle 16. In another non-limiting example, the camera 68 includes a camera affixed outside of the host vehicle 16, for example, on a roof of the host vehicle 16, having a view of the environment in front of the host vehicle 16.

In another exemplary embodiment, the camera 68 is a surround view camera system including a plurality of cameras (also known as satellite cameras) arranged to provide a view of the environment adjacent to all sides of the host vehicle 16. In a non-limiting example, the camera 68 includes a front-facing camera (mounted, for example, in a front grille of the host vehicle 16), a rear-facing camera (mounted, for example, on a rear tailgate of the host vehicle 16), and two side-facing cameras (mounted, for example, under each of two side-view mirrors of the host vehicle 16). In another non-limiting example, the camera 68 further includes an additional rear-view camera mounted near a center high mounted stop lamp of the host vehicle 16.

It should be understood that camera systems having additional cameras and/or additional mounting locations are within the scope of the present disclosure. It should further be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure. The camera 68 is in electrical communication with the host vehicle controller 50, as discussed above.

The radar sensor 70 is used to detect and measure the distance, speed, and direction of objects (e.g., the one or more target vehicles 20) by emitting radio waves and analyzing reflections of the radio waves. In an exemplary embodiment, the radar sensor 70 includes a radar transmitter, a radar antenna, a radar receiver, and a radar signal processing unit. In a non-limiting example, the radar transmitter emits radio frequency (RF) signals, which travel through space until they encounter an object. The RF signals bounce off the object's surface, return to the radar sensor 70. The radar receiver captures the reflected signals, and the radar signal processing unit analyzes the time delay, frequency shift, and amplitude of the returned RF signals to determine the distance, speed, and direction of the detected objects. The radar sensor 70 is in electrical communication with the host vehicle controller 50, as discussed above.

The LiDAR sensor 72 is utilized for remote sensing and environmental mapping by emitting laser pulses and measuring the time it takes for the laser pulses to return to the LiDAR sensor 72 after hitting objects. In an exemplary embodiment, the LiDAR sensor 72 includes a LIDAR laser source, a LiDAR scanner or mirror, a LIDAR photodetector, and a LIDAR time-of-flight measurement system. In a non-limiting example, the LiDAR laser source emits laser pulses that travel to the target area, and the LiDAR scanner directs these pulses in different directions. The emitted laser pulses interact with objects in the environment and their reflections are captured by the LiDAR photodetector. The LiDAR time-of-flight measurement system calculates the distance to the objects based on the time between emission of the laser pulses by the LiDAR laser source and reception of the reflected laser pulses by the LiDAR photodetector. The LiDAR sensor 72 is in electrical communication with the host vehicle controller 50, as discussed above.

In another exemplary embodiment, the perception sensor 62 further includes a stereoscopic camera having distance measurement capabilities. In one example, the perception sensor 62 is affixed inside of the host vehicle 16, for example, in a headliner of the host vehicle 16, having a view through the windscreen of the host vehicle 16. In another example, the perception sensor 62 is affixed outside of the host vehicle 16, for example, on a roof of the host vehicle 16, having a view of the environment surrounding the host vehicle 16. It should be understood that various additional types of perception sensors, such as, for example, ultrasonic ranging sensors and/or time-of-flight sensors are within the scope of the present disclosure. The perception sensor 62 is in electrical communication with the host vehicle controller 50 as discussed above.

The GNSS 64 is used to determine a geographical location of the host vehicle 16. In an exemplary embodiment, the GNSS 64 is a global positioning system (GPS). In a non-limiting example, the GPS includes a GPS receiver antenna (not shown) and a GPS controller (not shown) in electrical communication with the GPS receiver antenna. The GPS receiver antenna receives signals from a plurality of satellites, and the GPS controller calculates the geographical location of the host vehicle 16 based on the signals received by the GPS receiver antenna.

In an exemplary embodiment, the GNSS 64 additionally includes a map. The map includes information about infrastructure such as municipality borders, roadways, railways, sidewalks, buildings, and the like. Therefore, the geographical location of the host vehicle 16 is contextualized using the map information. In a non-limiting example, the map is retrieved from a remote source using a wireless connection. In another non-limiting example, the map is stored in a database of the GNSS 64.

It should be understood that various additional types of satellite-based radionavigation systems, such as, for example, the Global Positioning System (GPS), Galileo, GLONASS, and the BeiDou Navigation Satellite System (BDS) are within the scope of the present disclosure. It should be understood that the GNSS 64 may be integrated with the host vehicle controller 50 (e.g., on a same circuit board with the host vehicle controller 50 or otherwise a part of the host vehicle controller 50) without departing from the scope of the present disclosure.

In another exemplary embodiment, the host vehicle sensor 54 further includes sensors to determine performance data about the host vehicle 16. In a non-limiting example, the host vehicle sensor 54 further includes at least one of a motor speed sensor, a motor torque sensor, an electric drive motor voltage and/or current sensor, an accelerator pedal position sensor, a brake position sensor, a coolant temperature sensor, a cooling fan speed sensor, and a transmission oil temperature sensor.

In another exemplary embodiment, the host vehicle sensor 54 further includes additional sensors to determine information about an environment within the host vehicle 16. In a non-limiting example, the host vehicle sensor 54 further includes at least one of a seat occupancy sensor, a cabin air temperature sensor, a cabin motion detection sensor, a cabin camera, a cabin microphone, an occupant eye tracker, and/or the like.

In another exemplary embodiment, the host vehicle sensor 54 further includes additional sensors to determine information about an environment surrounding the host vehicle 16. In a non-limiting example, the host vehicle sensor 54 further includes at least one of an ambient air temperature sensor, a barometric pressure sensor, and/or the like. The host vehicle sensor 54 is in electrical communication with the host vehicle controller 50 as discussed above.

The host vehicle display 56 is used to provide information to an occupant of the host vehicle 16. In the scope of the present disclosure, the occupant includes a driver and/or a passenger of the host vehicle 16. In the exemplary embodiment depicted in FIG. 2, the host vehicle display 56 is a human-machine interface (HMI) located in view of the occupant and capable of displaying text, graphics and/or images. It is to be understood that HMI display systems including LCD displays, LED displays, and the like are within the scope of the present disclosure. Further exemplary embodiments where the host vehicle display 56 is disposed in a rearview mirror are also within the scope of the present disclosure.

In another exemplary embodiment, the host vehicle display 56 includes a head-up display (HUD) configured to provide information to the occupant by projecting text, graphics, and/or images upon the windscreen of the host vehicle 16. The text, graphics, and/or images are reflected by the windscreen of the host vehicle 16 and are visible to the occupant without looking away from the roadway 18 ahead of the host vehicle 16. In another exemplary embodiment, the host vehicle display 56 includes an augmented reality head-up display (AR-HUD). The AR-HUD is a type of HUD configured to augment the occupant's vision of the roadway ahead of the host vehicle 16 by overlaying text, graphics, and/or images on physical objects in the environment surrounding the host vehicle 16 within a field-of-view of the occupant. In an exemplary embodiment, the occupant may interact with the host vehicle display 56 using a human-interface device (HID), including, for example, a touchscreen, an electromechanical switch, a capacitive switch, a rotary knob, and the like. It should be understood that additional systems for displaying information to the occupant of the host vehicle 16 are also within the scope of the present disclosure. The host vehicle display 56 is in electrical communication with the host vehicle controller 50 as discussed above.

Figure 3:
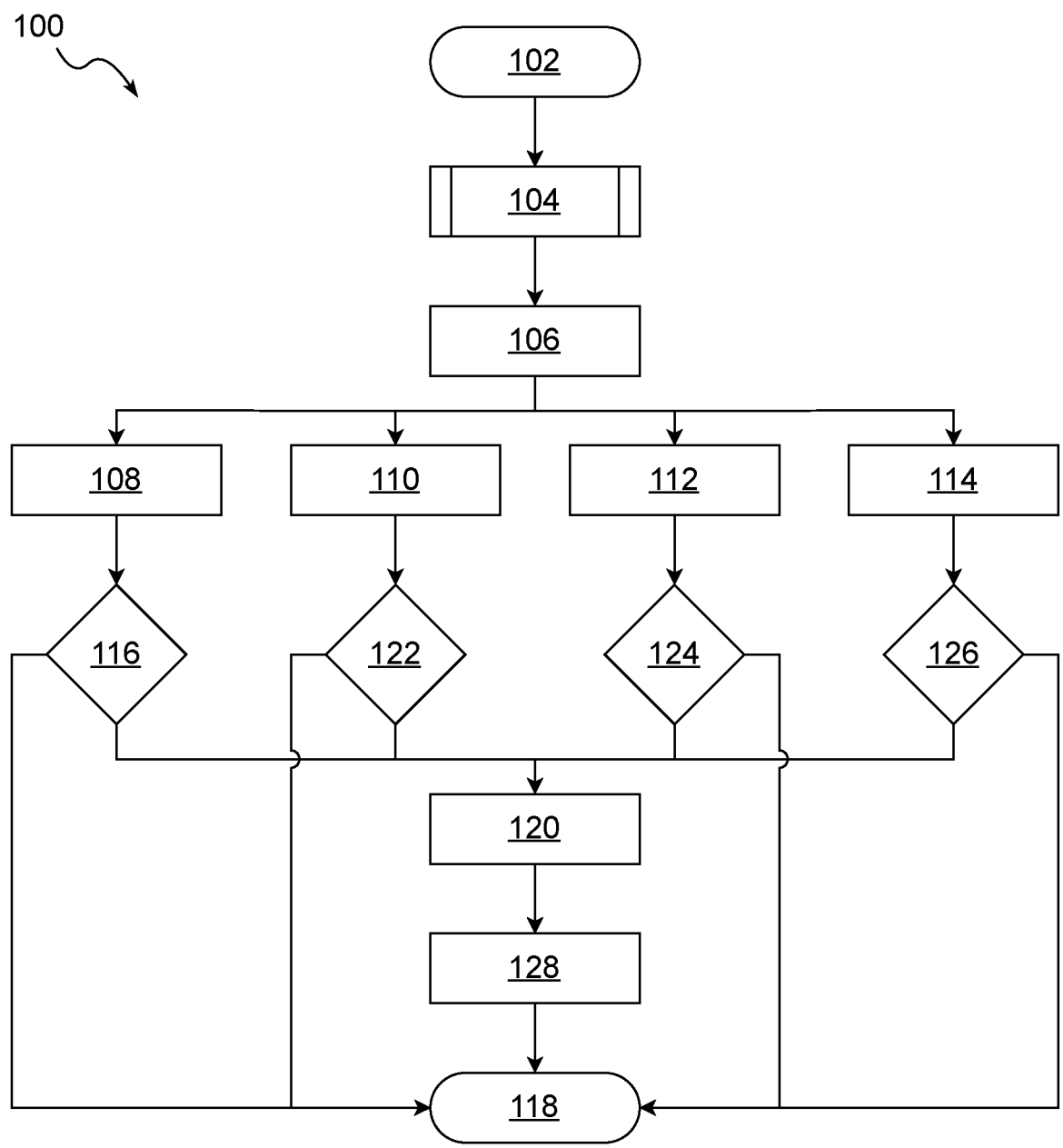
FIG. 3 is a flowchart of a method for identifying roadway safety events, according to an exemplary embodiment.

Referring to FIG. 3, a flowchart of the method 100 for identifying roadway safety events is shown. The method 100 begins at block 102 and proceeds to block 104. At block 104, a measurement of at least one of the one or more target vehicles 20 is performed. In an exemplary embodiment, the measurement includes a target vehicle location of each of the one or more target vehicles and a target vehicle velocity of each of the one or more target vehicles. In an exemplary embodiment, the measurement is performed using a sensor. In a non-limiting example, the sensor includes at least one of: the host vehicle sensor 54 of the host vehicle 16 (i.e., the host vehicle system 14), a mobile device (e.g., a smartphone, a smartwatch, a tablet, and/or the like), and/or a roadside unit (RSU). Performance of the measurement will be discussed in greater detail below. After block 104, the method 100 proceeds to block 106.

At block 106, the measurement is transmitted to the remote server system 12. In an exemplary embodiment, the host vehicle controller 50 uses the host vehicle communication system 52 to transmit the measurement to the remote server system 12 via the server communication system 34. In another exemplary embodiment, the mobile device uses a mobile device communication system to transmit the measurement to the remote server system 12 via the server communication system 34. In another exemplary embodiment, the RSU uses an RSU communication system to transmit the measurement to the remote server system 12 via the server communication system 34. In a non-limiting example, the server controller 30 receives the measurement using the server communication system 34 and stores the measurement in the server database 32. After block 106, the method 100 proceeds to blocks 108, 110, 112, and 114.

At block 108, the server controller 30 evaluates the measurement of the one or more target vehicles 20 to identify a target-to-infrastructure safety event. In the scope of the present disclosure, the target-to-infrastructure safety event describes an event where a target vehicle 20 violates a traffic regulation involving roadway infrastructure. In a non-limiting example, the target-to-infrastructure safety event includes, for example, departing from the roadway 18 and/or a lane of travel (e.g., crossing a lane line), driving a wrong direction in a one-way lane of travel, violating a stop sign, a yield sign, a traffic signal and/or other road signs, a no turn on red violation, a passing zone violation, a speed limit violation, and/or the like.

In an exemplary embodiment, to identify the target-to-infrastructure safety event, the server controller 30 first determines one or more traffic regulations applicable on the roadway 18. In the scope of the present disclosure, the one or more traffic regulations include, for example, lane line location and type, lane/roadway permitted direction of travel, traffic sign location, type, and content, traffic signal location, type, and phase, speed limit, and/or the like. In an exemplary embodiment, the server controller 30 retrieves the one or more traffic regulations from the server database 32. In another exemplary embodiment, the server controller 30 retrieves the one or more traffic regulations from an external system (e.g., the internet) using the server communication system 34.

After determining the one or more traffic regulations applicable on the roadway 18, the server controller 30 evaluates the measurement received at block 106 based at least in part on the one or more traffic regulations. In a non-limiting example, the server controller 30 compares the target vehicle location to a lane line location to identify a departure from the roadway 18 and/or a lane of travel. In a non-limiting example, the server controller 30 compares a direction of the target vehicle velocity to the lane/roadway permitted direction of travel to identify whether the target vehicle 20 is driving a wrong direction in a one-way lane of travel.

In a non-limiting example, the server controller 30 analyzes the target vehicle location and target vehicle velocity over time in the vicinity of one or more traffic signs/signals to identify a stop sign violation, a yield sign violation, a traffic signal violation, a passing zone violation, and/or the like. In a non-limiting example, the server controller 30 compares a magnitude of the target vehicle velocity to the speed limit of the roadway 18 to identify a speed limit violation.

It should be understood that additional analysis of the measurement may be performed to identify other types of target-to-infrastructure safety events without departing from the scope of the present disclosure. It should further be understood that the server controller 30 may utilize signal processing techniques, such as, for example, thresholding, filtering, pattern recognition, time-frequency analysis, statistical analysis, machine learning, and/or the like to identify the target-to-infrastructure safety event without departing from the scope of the present disclosure. After block 108, the method 100 proceeds to block 116.

At block 116, if the target-to-infrastructure safety event is not identified at block 108, the method 100 proceeds to enter a standby state at block 118. If the target-to-infrastructure safety event is identified at block 108, the method 100 proceeds to block 120, as will be discussed in greater detail below.

At block 110, the server controller 30 evaluates the measurement of the one or more target vehicles 20 to identify a target-to-target safety event. In the scope of the present disclosure, the target-to-target safety event describes an event where two or more target vehicles 20 are involved in an unsafe driving situation. In a non-limiting example, the target-to-target safety event includes, for example, a collision between two or more target vehicles 20, a near collision between two or more target vehicles 20, an aggressive maneuver (e.g., hard braking, hard acceleration, hard cornering, aggressive lane change) involving two or more target vehicles 20, tailgating (i.e., close following distance) between two or more target vehicles 20, and/or the like.

In an exemplary embodiment, to identify the target-to-target safety event, the server controller 30 calculates a time-to-collision (TTC) between the two or more target vehicles 20 (e.g., the first target vehicle 20a and the second target vehicle 20b). In the scope of the present disclosure, the time-to-collision (TTC) quantifies an estimated time it will take for the first target vehicle 20a to collide with the second target vehicle 20b (i.e., for the first target vehicle 20a and the second target vehicle 20b to reach a common point in space, based on their trajectories).

In a non-limiting example, to calculate the TTC, the server controller 30 determines a first trajectory of the first target vehicle 20a (i.e., a future path of the first target vehicle 20a) based at least in part on a first target vehicle velocity and a first target vehicle location of the first target vehicle 20a. The server controller 30 further determines a second trajectory of the second target vehicle 20b (i.e., a future path of the second target vehicle 20b) based at least in part on a second target vehicle velocity and a second target vehicle location of the second target vehicle 20b. The server controller 30 then evaluates the first trajectory and the second trajectory to determine whether the first trajectory intersects with the second trajectory. If the first trajectory and the second trajectory do not intersect, the TTC is determined to be infinite.

If the first trajectory and the second trajectory do intersect, the server controller 30 determines a distance between the first target vehicle 20a and the second target vehicle 20b based at least in part on the first target vehicle location and the second target vehicle location. The server controller 30 then determines a relative velocity between the first target vehicle 20a and the second target vehicle 20b based at least in part on a magnitude of the first target vehicle velocity and a magnitude of the second target vehicle velocity.

To determine the TTC, the server controller 30 divides the distance between the first target vehicle 20a and the second target vehicle 20b by the relative velocity between the first target vehicle 20a and the second target vehicle 20b. In a non-limiting example, the target-to-target safety event is identified if the TTC is less than or equal to a predetermined time-to-collision threshold (e.g., three seconds).

It should be understood that additional analysis of the measurement may be performed to identify other types of target-to-target safety events without departing from the scope of the present disclosure. It should further be understood that the server controller 30 may utilize signal processing techniques, such as, for example, thresholding, filtering, pattern recognition, time-frequency analysis, statistical analysis, machine learning, and/or the like to identify the target-to-target safety event without departing from the scope of the present disclosure. After block 110, the method 100 proceeds to block 122.

At block 122, if the target-to-target safety event is not identified at block 110, the method 100 proceeds to enter the standby state at block 118. If the target-to-target safety event is identified at block 110, the method 100 proceeds to block 120, as will be discussed in greater detail below.

At block 112, the server controller 30 evaluates the measurement of the one or more target vehicles 20 to identify an erratic driving safety event. In the scope of the present disclosure, the erratic driving safety event describes a situation or occurrence involving unpredictable and irregular driving behavior which poses potential risks to road users. In a non-limiting example, the erratic driving safety event includes, for example, an abrupt lane change, a sudden acceleration or deceleration, aggressive driving, and/or other erratic driving patterns. In an exemplary embodiment, the server controller 30 uses an erratic driving identification machine learning model to identify the erratic driving safety event.

In a non-limiting example, the erratic driving identification machine learning model includes multiple layers, including an input layer and an output layer, as well as one or more hidden layers. The input layer receives the measurement performed at block 104 as an input. The input is then passed on to the hidden layers. Each hidden layer applies a transformation (e.g., a non-linear transformation) to the data and passes the result to the next hidden layer until the final hidden layer. The output layer produces an erratic driving safety event classification. In the scope of the present disclosure, the erratic driving safety event classification includes, for example, a no event classification (i.e., no erratic driving behavior is identified), an abrupt lane change classification, an abrupt speed change classification, an aggressive driving classification, and/or the like.

To train the erratic driving identification machine learning model, a dataset of inputs and their corresponding erratic driving safety event classification is used. The algorithm is trained by adjusting internal weights between nodes in each hidden layer to minimize prediction error. During training, an optimization technique (e.g., gradient descent) is used to adjust the internal weights to reduce the prediction error. The training process is repeated with the entire dataset until the prediction error is minimized, and the resulting trained model is then used to classify new input data.

After sufficient training of the erratic driving identification machine learning model, the algorithm is capable of accurately and precisely determining the erratic driving safety event classification based on the measurement performed at block 104. By adjusting the weights between the nodes in each hidden layer during training, the algorithm "learns" to recognize patterns in the measurement data which are indicative of the erratic driving safety event classification.

It should be understood that additional analysis of the measurement may be performed to identify other types of erratic driving safety events without departing from the scope of the present disclosure. It should further be understood that the server controller 30 may utilize signal processing techniques, such as, for example, thresholding, filtering, pattern recognition, time-frequency analysis, statistical analysis, and/or the like to identify the erratic driving safety event without departing from the scope of the present disclosure. After block 112, the method 100 proceeds to block 124.

At block 124, if the erratic driving safety event is not identified at block 112 (i.e., the erratic driving safety event classification is the no event classification), the method 100 proceeds to enter the standby state at block 118. If the erratic driving safety event is identified at block 112, the method 100 proceeds to block 120, as will be discussed in greater detail below.

At block 114, the server controller 30 evaluates the measurement of the one or more target vehicles 20 to identify an unobserved safety event. In the scope of the present disclosure, the unobserved safety event describes a situation or occurrence happening outside of a field of view of the sensor (e.g., the host vehicle sensor 54) which poses potential risks to road users. In a non-limiting example, the unobserved safety event includes any of the target-to-infrastructure safety events, target-to-target safety events, and/or erratic driving safety events discussed above.

For example, a near collision far ahead of the host vehicle 16 on the roadway 18 may occur outside of the field of view of the host vehicle sensor 54, but the host vehicle sensor 54 may observe responses of other target vehicles 20 within the field of view of the host vehicle sensor 54 to the near collision. Therefore, even without directly observing the unobserved safety event, information about the unobserved safety event may be gleaned from the measurement performed at block 104. In an exemplary embodiment, the server controller 30 uses an unobserved safety event identification machine learning model to identify the unobserved safety event.

In a non-limiting example, the unobserved safety event identification machine learning model includes multiple layers, including an input layer and an output layer, as well as one or more hidden layers. The input layer receives the measurement performed at block 104 as an input. In an exemplary embodiment, the input further may include additional information such as, for example, telemetry data, advanced driver assistance system (ADAS) data, and/or accident data/warnings received from external sources. The input is then passed on to the hidden layers. Each hidden layer applies a transformation (e.g., a non-linear transformation) to the data and passes the result to the next hidden layer until the final hidden layer. The output layer produces an unobserved safety event classification.

In the scope of the present disclosure, the unobserved safety event classification includes, for example, a no event classification (i.e., no unobserved safety event is identified), an unobserved target-to-infrastructure classification, an unobserved target-to-target classification, an unobserved erratic driving classification, and/or the like. It should be understood that the unobserved safety event classification may include more specific classifications (e.g., an unobserved near collision classification) without departing from the scope of the present disclosure. It should further be understood that the output layer may produce additional information such as, for example, a predicted location of the unobserved safety event and/or a confidence of the unobserved safety event classification.

To train the unobserved safety event identification machine learning model, a dataset of inputs and their corresponding unobserved safety event classification is used. The algorithm is trained by adjusting internal weights between nodes in each hidden layer to minimize prediction error. During training, an optimization technique (e.g., gradient descent) is used to adjust the internal weights to reduce the prediction error. The training process is repeated with the entire dataset until the prediction error is minimized, and the resulting trained model is then used to classify new input data.

After sufficient training of the unobserved safety event identification machine learning model, the algorithm is capable of accurately and precisely determining the unobserved safety event classification based on the measurement performed at block 104. By adjusting the weights between the nodes in each hidden layer during training, the algorithm "learns" to recognize patterns in the measurement data which are indicative of the unobserved safety event classification.

It should be understood that additional analysis of the measurement may be performed to identify other types of unobserved safety events without departing from the scope of the present disclosure. It should further be understood that the server controller 30 may utilize signal processing techniques, such as, for example, thresholding, filtering, pattern recognition, time-frequency analysis, statistical analysis, and/or the like to identify the unobserved safety event without departing from the scope of the present disclosure. After block 114, the method 100 proceeds to block 126.

At block 126, if the unobserved safety event is not identified at block 114 (i.e., the unobserved safety event classification is the no event classification), the method 100 proceeds to enter the standby state at block 118. If the unobserved safety event is identified at block 114, the method 100 proceeds to block 120.

At block 120, the server controller 30 performs a first action based at least in part on the safety event. In an exemplary embodiment, the first action includes transmitting a safety event message to the host vehicle 16. In a non-limiting example, the safety event message includes at least one of: information about the target-to-infrastructure safety event identified at block 108 (i.e., a location, type, severity, and/or the like), information about the target-to-target safety event identified at block 110 (i.e., a location, type, severity, and/or the like), information about the erratic driving safety event classification determined at block 112 (i.e., a location, type, severity, and/or the like), and/or information about the unobserved safety event classification determined at block 114 (i.e., a location, type, severity, and/or the like). The safety event message further includes a geographical location of each of the aforementioned safety events. In an exemplary embodiment, the server controller 30 uses the server communication system 34 to transmit the safety event message. The safety event message is received by the host vehicle controller 50 using the host vehicle communication system 52.

In another exemplary embodiment, the safety event message further includes statistical information about safety events within a particular geographical area (e.g., a one-mile radius) near the host vehicle 16. In a non-limiting example, the statistical information includes, for example, a rate of occurrence of safety events, a quantity of safety events, a geographical density of safety events, and/or the like.

In another exemplary embodiment, at block 120, the server controller 30 saves the safety event message in the server database 32. In a non-limiting example, the safety event message is later retrieved for purposes of analysis to improve road infrastructure and/or road safety, creating regional road risk assessments, and/or the like. After block 120, the method 100 proceeds to block 128.

At block 128, the host vehicle controller 50 performs the first action based at least in part on the safety event. In an exemplary embodiment, the first action further includes using the host vehicle communication system 52 to receive the safety event message transmitted at block 120. In an exemplary embodiment, the host vehicle controller 50 uses the host vehicle display 56 to provide an in-vehicle warning to the occupant of the host vehicle 16 based at least in part on the safety event message. For example, the host vehicle controller 50 may use the host vehicle display 56 to display a warning including text, images, icons, and/or the like. In a non-limiting example, the warning includes text describing a type, location, severity, and/or the like of the safety event contained in the safety event message transmitted at block 120.

In another exemplary embodiment, the host vehicle controller 50 uses the GNSS 64 to determine a navigation suggestion based at least in part on a quantity of safety events within a particular geographical area. In a non-limiting example, the host vehicle controller 50 uses the GNSS 64 to calculate a navigation route based at least in part on the statistical information about safety events within the particular geographical area, for example, the navigation route may be configured to avoid geographical areas having a high density or rate of occurrence of safety events. After block 128, the method 100 proceeds to enter the standby state at block 118.

In an exemplary embodiment, the method 100 repeatedly restarts at block 102. In a non-limiting example, the method 100 restarts on a timer, for example, every three hundred milliseconds.

Figure 4:
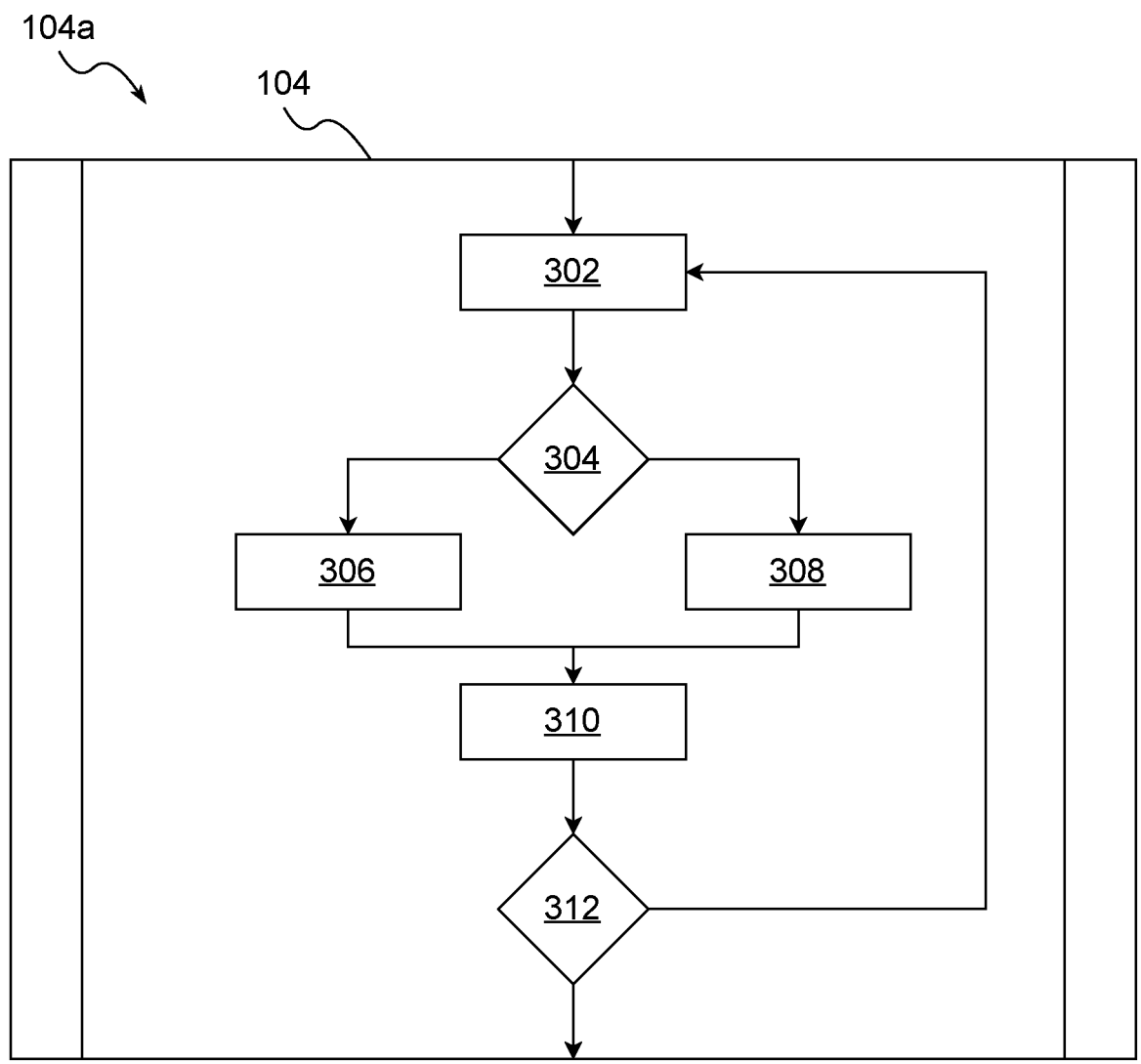
FIG. 4 is a flowchart of a method for performing a measurement, according to an exemplary embodiment.

Referring to FIG. 4, a flowchart of an exemplary embodiment 104a of block 104 (i.e., a method for performing a measurement) is shown. The exemplary embodiment 104a begins at block 302. As discussed above, the measurement is performed using a sensor. In a non-limiting example, the sensor includes at least one of: the host vehicle sensor 54 of the host vehicle system 14, a mobile device (e.g., a smartphone, a smartwatch, a tablet, and/or the like), and/or a roadside unit (RSU). The exemplary embodiment 104a will be explained in reference to an exemplary embodiment where the sensor is the host vehicle sensor 54. It should be understood that the following method steps are also applicable to a mobile device, and/or a roadside unit (RSU).

At block 302, the host vehicle controller 50 selects a selected target vehicle. In a non-limiting example, the selected target vehicle may be any of the target vehicles 20 (e.g., the first target vehicle 20a or the second target vehicle 20b). After block 302, the exemplary embodiment 104a proceeds to block 304.

At block 304, the host vehicle controller 50 determines whether the selected target vehicle is within the field of view of the host vehicle sensor 54. For example, if the host vehicle sensor 54 includes only a front facing camera, and the selected target vehicle is behind the host vehicle 16, the selected target vehicle is not within the field of view of the host vehicle sensor 54. If the selected target vehicle is not within the field of view of the host vehicle sensor 54, the exemplary embodiment 104a proceeds to block 306. If the selected target vehicle is within the field of view of the host vehicle sensor 54, the exemplary embodiment 104a proceeds to block 308, as will be discussed in greater detail below.

At block 306, the host vehicle controller 50 extrapolates at least one of: the target vehicle location of the selected target vehicle and the target vehicle velocity of the selected target vehicle in response to determining that the selected target vehicle is outside of the field of view of the host vehicle sensor 54. In an exemplary embodiment, the host vehicle controller 50 uses a time-series forecasting method to predict (i.e., extrapolate) future values of the target vehicle location of the selected target vehicle and the target vehicle velocity of the selected target vehicle based on one or more past measurements of the selected target vehicle stored in the host vehicle media 60 and/or the server database 32.

In a non-limiting example, the time-series forecasting method includes, for example, an autoregressive integrated moving average (ARIMA), exponential smoothing, and/or machine learning models for forecasting/extrapolating time-series data. In a non-limiting example, a decaying confidence value is assigned to the extrapolations of the target vehicle location of the selected target vehicle and the target vehicle velocity of the selected target vehicle based on the time elapsed since the last ground-truth measurement was received (i.e., since the selected target vehicle was last within the field of view of the host vehicle sensor 54).

In another exemplary embodiment, the host vehicle controller 50 extrapolates the target vehicle location of the selected target vehicle and the target vehicle velocity of the selected target vehicle by assuming that a rate of change in target vehicle location and a rate of change in target vehicle velocity of the selected target vehicle remain constant. After a predetermined amount of time since the last ground-truth measurement has elapsed, the prediction (i.e., extrapolation) of the target vehicle location of the selected target vehicle and the target vehicle velocity of the selected target vehicle is considered to be invalid and is discarded. After block 306, the exemplary embodiment 104a proceeds to block 310, as will be discussed in greater detail below.

At block 308, the host vehicle controller 50 uses the host vehicle sensor 54 to perform the measurement of the selected target vehicle (e.g., the first target vehicle 20a or the second target vehicle 20b) in response to determining that the selected target vehicle is within the field of view of the host vehicle sensor 54. As discussed above, the measurement includes at least a target vehicle location and a target vehicle velocity of the selected target vehicle. After block 308, the exemplary embodiment 104*a* proceeds to block 310.

At block 310, the host vehicle controller 50 updates the location of the selected target vehicle in memory. In an exemplary embodiment, the extrapolated target vehicle location of the selected target vehicle and the extrapolated target vehicle velocity of the selected target vehicle determined at block 306 are saved in the host vehicle media 60 and/or the server database 32. As discussed above, the extrapolated target vehicle location of the selected target vehicle and the extrapolated target vehicle velocity of the selected target vehicle may include a confidence value which decays as time since the last ground-truth measurement of the selected target vehicle elapses. In another exemplary embodiment, the target vehicle location of the selected target vehicle and the target vehicle velocity of the selected target vehicle measured at block 308 are saved in the host vehicle media 60 and/or the server database 32. As discussed above, the target vehicle location of the selected target vehicle and the target vehicle velocity of the selected target vehicle measured at block 308 may be later retrieved from the host vehicle media 60 and/or the server database 32 for use to perform extrapolation at block 306. After block 310, the exemplary embodiment 104*a* proceeds to block 312.

At block 312, if all of the target vehicles 20 have not yet been selected in the exemplary embodiment 104*a*, the exemplary embodiment 104*a* returns to block 302 to select a next selected target vehicle. If all of the target vehicles 20 have been selected in the exemplary embodiment 104*a*, the exemplary embodiment 104*a* is concluded, and the method 100 proceeds as discussed above.

The system 10 and method 100 of the present disclosure offer several advantages. By utilizing the host vehicle system 14 of the host vehicle 16 equipped with the host vehicle sensor 54 to gather data about target vehicles 20, data about safety events related to the target vehicles 20 may be acquired, even if the target vehicles 20 do not have measurement and/or wireless communication capabilities. According to the present disclosure, the system 10 and method 100 may be applied using a plurality of host vehicles, allowing for large amounts of measurement data about unconnected target vehicles to be aggregated by the remote server system 12. Therefore, the remote server system 12 may fuse data from multiple host vehicles to provide a high degree of measurement coverage of the roadway 18. The fused data may be used with advanced driver assistance systems (ADAS) to provide occupants with critical information about safety events on the roadway 18. The fused data may be used with global navigation satellite systems (GNSS) to adjust navigation routing based on safety events on the roadway 18. The fused data may further be used to improve road infrastructure and/or road safety, create regional road risk assessments, and/or the like.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for identifying roadway safety events, the method comprising:
   performing a measurement of one or more target vehicles using a sensor;
   identifying a safety event based at least in part on the measurement of the one or more target vehicles, wherein identifying the safety event further comprises:
   evaluating the measurement of the one or more target vehicles to identify a target-to-infrastructure safety event;
   evaluating the measurement of the one or more target vehicles to identify a target-to-target safety event, wherein evaluating the measurement of the one or more target vehicles to identify the target-to-target safety event further comprises:
   calculating a time-to-collision between a first target vehicle and a second target vehicle of the one or more target vehicles based at least in part on the measurement of the one or more target vehicles; and
   identifying the target-to-target safety event in response to determining that the time-to-collision is less than or equal to a predetermined time-to-collision threshold;
   evaluating the measurement of the one or more target vehicles to identify an erratic driving safety event; and
   evaluating the measurement of the one or more target vehicles to identify an unobserved safety event; and
   performing an action based at least in part on the safety event.

2. The method of claim 1, wherein performing the measurement further comprises:
   performing the measurement of the one or more target vehicles, wherein the sensor includes at least one of: a host vehicle sensor of a host vehicle, a mobile device, and a roadside unit (RSU), wherein the measurement of the one or more target vehicles includes at least a target vehicle location of each of the one or more target vehicles and a target vehicle velocity of each of the one or more target vehicles.

3. The method of claim 2, wherein performing the measurement further comprises:
   performing the measurement of the one or more target vehicles, wherein the sensor is the host vehicle sensor of the host vehicle.

4. The method of claim 2, wherein performing the measurement further comprises:
   extrapolating at least one of: the target vehicle location and the target vehicle velocity of a first target vehicle of the one or more target vehicles in response to determining that the first target vehicle is outside of a field of view of the sensor, wherein the at least one of: the target vehicle location and the target vehicle velocity of the first target vehicle is extrapolated based at least in part on one or more past measurements of the first target vehicle.

5. The method of claim 1, wherein evaluating the measurement of the one or more target vehicles to identify the target-to-infrastructure safety event further comprises:
   evaluating the measurement of the one or more target vehicles based at least in part on one or more traffic regulations; and
   identifying the target-to-infrastructure safety event in response to determining that at least one of the one or more target vehicles is in violation of the one or more traffic regulations.

6. The method of claim 1, wherein evaluating the measurement of the one or more target vehicles to identify the erratic driving safety event further comprises:

executing an erratic driving identification machine learning model, wherein the erratic driving identification machine learning model is configured to receive the measurement of the one or more target vehicles as an input and identify the erratic driving safety event based at least in part on the measurement of the one or more target vehicles.

7. The method of claim 1, wherein evaluating the measurement of the one or more target vehicles to identify the unobserved safety event further comprises:
executing an unobserved safety event identification machine learning model, wherein the unobserved safety event identification machine learning model is configured to receive the measurement of the one or more target vehicles as an input and identify the unobserved safety event based at least in part on the measurement of the one or more target vehicles, and wherein the unobserved safety event occurs outside of a field of view of the sensor.

8. The method of claim 1, wherein performing the action based at least in part on the safety event further comprises:
providing an in-vehicle warning to an occupant; and
providing a navigation suggestion based at least in part on a quantity of safety events within a particular geographical area.

9. A system for identifying roadway safety events for a host vehicle, the system comprising:
a remote server system including:
a server communication system; and
a server controller in electrical communication with the server communication system, wherein the server controller is programmed to:
receive a measurement of one or more target vehicles using the server communication system;
identify a safety event based at least in part on the measurement of the one or more target vehicles, wherein to identify the safety event, the server controller is further programmed to:
evaluate the measurement of the one or more target vehicles to identify a target-to-infrastructure safety event;
evaluate the measurement of the one or more target vehicles to identify a target-to-target safety event;
evaluate the measurement of the one or more target vehicles to identify an erratic driving safety event, wherein to evaluate the measurement of the one or more target vehicles to identify the erratic driving safety event, the server controller is further programmed to:
execute an erratic driving identification machine learning model, wherein the erratic driving identification machine learning model is configured to receive the measurement of the one or more target vehicles as an input and identify the erratic driving safety event based at least in part on the measurement of the one or more target vehicles; and
evaluate the measurement of the one or more target vehicles to identify an unobserved safety event; and
perform an action based at least in part on the safety event.

10. The system of claim 9, wherein to identify the safety event, the server controller is further programmed to:

evaluate the measurement of the one or more target vehicles based at least in part on one or more traffic regulations;
calculate a time-to-collision between a first target vehicle and a second target vehicle of the one or more target vehicles based at least in part on the measurement of the one or more target vehicles;
identify the target-to-infrastructure safety event in response to determining that at least one of the one or more target vehicles is in violation of the one or more traffic regulations; and
identify the target-to-target safety event in response to determining that the time-to-collision is less than or equal to a predetermined time-to-collision threshold.

11. The system of claim 9, wherein to evaluate the measurement of the one or more target vehicles to identify the unobserved safety event, the server controller is further programmed to:
execute an unobserved safety event identification machine learning model, wherein the unobserved safety event identification machine learning model is configured to receive the measurement of the one or more target vehicles as an input and identify the unobserved safety event based at least in part on the measurement of the one or more target vehicles.

12. The system of claim 9, further comprising:
a host vehicle system including:
a host vehicle communication system;
a host vehicle sensor; and
a host vehicle controller in electrical communication with the host vehicle communication system and the host vehicle sensor, wherein the host vehicle controller is programmed to:
perform a measurement of one or more target vehicles using the host vehicle sensor, wherein the one or more target vehicles are remote from the host vehicle; and
transmit the measurement of the one or more target vehicles to the remote server system using the host vehicle communication system.

13. The system of claim 12:
wherein to perform the action based at least in part on the safety event, the server controller is further programmed to:
transmit a safety event message to the host vehicle using the server communication system, wherein the safety event message includes information regarding the safety event; and
wherein the host vehicle system further comprises a host vehicle display in electrical communication with the host vehicle controller, and wherein to perform the action based at least in part on the safety event, the host vehicle controller is further programmed to:
receive the safety event message from the remote server system using the host vehicle communication system; and
provide an in-vehicle warning to an occupant of the host vehicle using the host vehicle display based at least in part on the safety event message.

14. A method for identifying roadway safety events, the method comprising:
performing a measurement of one or more target vehicles using a sensor, wherein the sensor is remote from the one or more target vehicles, and wherein the sensor includes at least one of: a host vehicle sensor of a host vehicle, a mobile device, and a roadside unit (RSU), wherein the measurement of the one or more target vehicles includes at least a target vehicle location of each of the one or more target vehicles and a target vehicle velocity of each of the one or more target vehicles, wherein performing the measurement further comprises:
  extrapolating at least one of: the target vehicle location and the target vehicle velocity of a first target vehicle of the one or more target vehicles in response to determining that the first target vehicle is outside of a field of view of the sensor, wherein the at least one of: the target vehicle location and the target vehicle velocity of the first target vehicle is extrapolated based at least in part on one or more past measurements of the first target vehicle;
identifying a safety event based at least in part on the measurement of the one or more target vehicles, wherein the safety event includes at least one of: a target-to-infrastructure safety event, a target-to-target safety event, an erratic driving safety event, and an unobserved safety event, wherein identifying the safety event further comprises:
  evaluating the measurement of the one or more target vehicles based at least in part on one or more traffic regulations;
  identifying the target-to-infrastructure safety event in response to determining that the first target vehicle is in violation of the one or more traffic regulations;
  calculating a time-to-collision between the first target vehicle and a second target vehicle based at least in part on the measurement of the one or more target vehicles;
  identifying the target-to-target safety event in response to determining that the time-to-collision is less than or equal to a predetermined time-to-collision threshold;
  executing an erratic driving identification machine learning model, wherein the erratic driving identification machine learning model is configured to receive the measurement of the one or more target vehicles as an input and identify the erratic driving safety event based at least in part on the measurement of the one or more target vehicles; and
  executing an unobserved safety event identification machine learning model, wherein the unobserved safety event identification machine learning model is configured to receive the measurement of the one or more target vehicles as an input and identify the unobserved safety event based at least in part on the measurement of the one or more target vehicles, and wherein the unobserved safety event occurs outside of the field of view of the sensor; and
performing an action based at least in part on the safety event.

\* \* \* \* \*